May 21, 1963 J. VON GROTTHUSS ETAL 3,090,672
METHOD OF DETERMINING THE CONTENT OF
DEUTERIUM HYDRIDE IN HYDROGEN
Filed Dec. 7, 1959 2 Sheets-Sheet 1
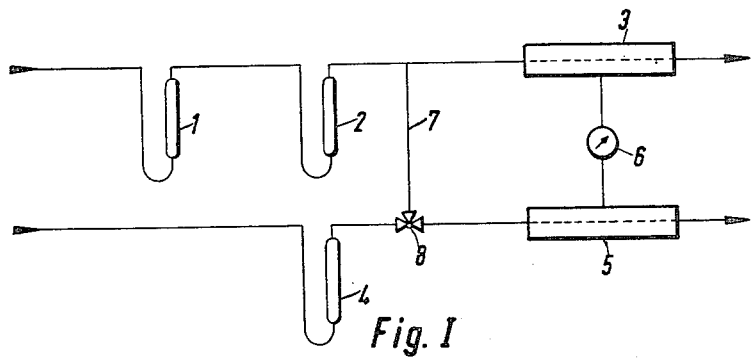
Fig. I
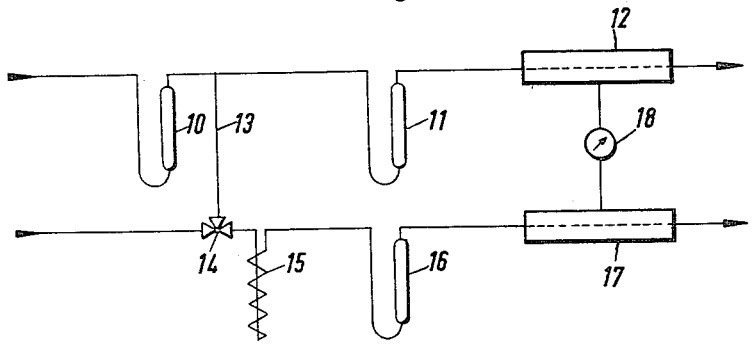
Fig. II
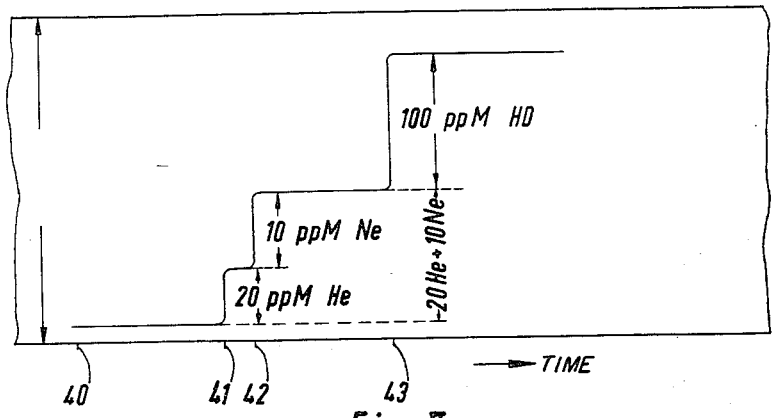
Fig. IIa

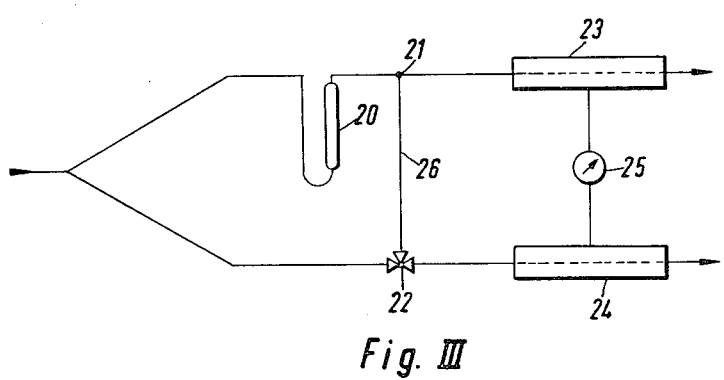
Fig. III
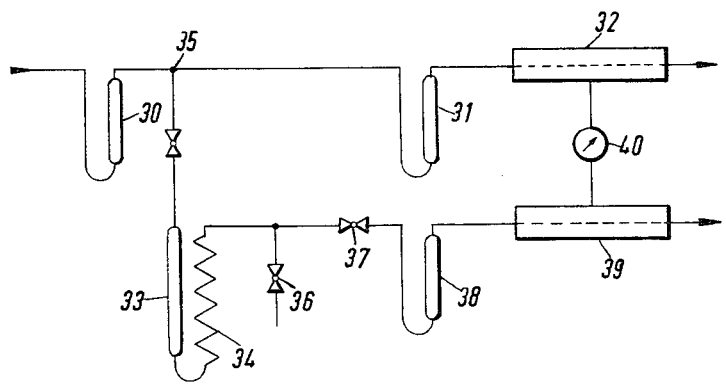
Fig. IV

United States Patent Office
3,090,672
Patented May 21, 1963

3,090,672
METHOD OF DETERMINING THE CONTENT OF DEUTERIUM HYDRIDE IN HYDROGEN
Johann von Grotthuss, deceased, late of Munich, Germany, by Elisabeth von Grotthuss, heir, Munich-Solln, Germany, and legal representative of Ina Maria von Grotthuss and Michael von Grotthuss, heirs, both of Munich-Solln, Germany, and Sibylle Sohler, heir, Jachenau, Forsthaus, Germany; Karl Jaeger, Pullach, Germany, and Heinz Karwat, Munich-Solln, Germany, assignors to Gesellschaft für Linde's Eismaschinen Aktiengesellschaft, Hollriegelskreuth, near Munich, Germany
Filed Dec. 7, 1959, Ser. No. 857,994
Claims priority, application Germany Dec. 8, 1958
16 Claims. (Cl. 23—232)

This invention relates to the art of analyzing gases, and is concerned with an improved method of and apparatus for determining the content of deuterium hydride in technical hydrogen.

The mass spectrograph is generally used for the determination of deuterium hydride, HD, in technical hydrogen. This apparatus is very expensive and can only be operated by highly qualified personnel. For scientific purposes it has also been attempted to determine the content of deuterium hydride in technical hydrogen by measuring the thermal conductivity of the mixture. Mixtures were compared which had been produced by adding known quantities of deuterium hydride to pure hydrogen, and a sensitivity of the measuring arrangement of plus-or-minus 100 p.p.m. HD in hydrogen was found.

Unfortunately, this method fails completely when it is applied to technical mixtures with an unknown content of deuterium hydride, which mixtures also contain unknown quantities of accompanying gases such as nitrogen, argon or oxygen, even when these accompanying substances have first been removed from the sample to be tested by adsorption or freezing at low temperature. The observed effects on the thermal conductivity apparatus correspond, then, in no way to the deuterium hydride content in the mixture. The method of the present invention overcomes this inconvenience.

The method of the invention for determining the content of deuterium hydride in technical hydrogen by measuring the thermal conductivity of the mixture, which has first been freed from impurities, like nitrogen, by freezing or adsorption at low temperature, is characterized in that a ratio of ortho- to para-hydrogen is first established in the hydrogen-HD mixture, before it is fed to the measuring chamber of the thermal conductivity apparatus, which is equal or substantially equal to the ortho-para equilibrium at the temperature of the measuring wire. This is done, for example, by conducting the mixture, which has first been purified at low temperature, at room or higher temperature over substances which accelerate the establishment of the ortho-para equilibrium. As such accelerators we prefer to use substances which are already known as accelerators, such as palladium or titanium, either in the form of sheet metal or finely divided on a base such as asbestos. A similar accelerated effect is exerted, according to the invention, by a silica gel to which cobalt salts have been added which salts have then been reduced with hydrogen. In most cases it suffices to effect the ortho-para transformation at room temperature, because the ortho-para equilibrium changes but little with temperatures above room temperature.

In the same manner as in the hydrogen-HD mixture to be measured, the ratio of ortho- to para-hydrogen corresponding to the temperature of the measuring wire is also produced in the hydrogen which is introduced as a reference gas into the comparison chamber of the thermal conductivity apparatus and which—to this end—has been freed from contaminating admixtures by freezing or adsorption at low temperature. Without these measures, the ortho-para ratio that has first been imparted to the hydrogen at low temperature would tend to pass over at the measuring wires of the thermal conductivity apparatus into the ratio which is stable at the temperature of the measuring wire, and the heat effect of this transformation would change the temperature of the measuring wires, that is, it would cool off the wires. The present invention is based on the discovery of this phenomenon and the application of this discovery to the present problem.

After the preliminary treatment of the measuring gases according to the invention, the reading of the thermal conductivity apparatus is associated definitely with the HD content for pure hydrogen-HD-mixtures, with a reliability exceeding that of the mass spectrograph.

The concept of the invention also offers the possibility of measuring the content of ortho- and para-hydrogen, in addition to the HD content, which possibility is of importance, for example, for evaluating a hydrogen-HD rectifying column. To this end, we measure the difference of the thermal conductivity of hydrogen which is fed into the thermal conductivity apparatus from the low-temperature zones without special treatment against the hydrogen whose ortho-para ratio has been adjusted to the temperature of the measuring wire. This step of the invention is based on the finding that the rate of the ortho-para ratio in the gas to be measured is proportional to the ortho-para ratio at the wire temperature. The same holds true for the heat consumption by ortho-para transformation at the wire and for the change of the wire temperature and for the deflection of the millivoltmeter. This mode of measuring the contents of ortho- and para-hydrogen in hydrogen is new and unexcelled in its simplicity.

Technical hydrogen frequently contains neon and helium in addition to nitrogen, oxygen, carbon monoxide, and argon. By freezing or adsorption at low temperature it is possible to separate the latter substances, but not the neon and helium which accompany the hydrogen and HD in all stages of separation by rectification. In order to determine by thermal conductivity measurement the content of neon and helium in hydrogen, in addition to the HD content, it has been found operable—according to another feature of the invention—to conduct the neon- and helium-containing hydrogen-HD mixture through a gas-chromatic separating column, before adjusting the ortho-para ratio to the temperature of the measuring wire, in such a way that the constituents helium, neon and HD issue from the column in steps, corresponding to their different travel velocities carried by the hydrogen current, and are indicated successively on the thermal conductivity apparatus after passing through a tube filled with palladium-asbestos. According to the invention, a synthetic zeolite is used for filling the gas-chromatic separating column which is known under the name of "molecular sieve." On these substances neon, helium and HD have sufficiently different travel velocities to make possible the above-stated stepwise determinations.

Following the general measuring procedure, the measuring gas with an unknown content of HD is compared in the above-described measurements with a reference gas having a known HD content. In order to measure the content of this reference gas in absolute values, the thermal conductivity is compared with that of HD-free hydrogen. The latter is produced, according to the invention, by gas-chromatography. HD-containing hydrogen is conducted, at as low a temperature as possible, for example, —194° C., over a substance which adjusts the ratio of ortho- to para-hydrogen to the equilibrium at this temperature. Suitable substances are iron-III oxide-gel or silica gel saturated with cobalt salts which have been reduced with hydrogen. The gas then is introduced into a profoundly cooled and evacuated chromatic separating column at such a velocity that pure para-hydrogen accumulates under increasing pressure at the outlet of the separating column as the fraction with the maximum travel velocity. When the atmospheric pressure has been attained the separating column is opened, the para-hydrogen is transformed over palladium into the ortho-para mixture corresponding to the temperature of the measuring wire, and subsequently conducted through the comparison chamber of the thermal conductivity apparatus the measuring chamber of which is traversed by the hydrogen-HD mixture to be tested which has first been conducted over palladium.

*Example I (See Schematic Representation in FIGURE I)*

Helium- and neon-free electrolytic hydrogen with 200 p.p.m. HD is freed, by passage over deeply cooled (—183° C.) silica gel, from its content of nitrogen, etc., and a ratio ortho-hydrogen:para-hydrogen of about 65:35 is established. By conducting the gas over palladium-asbestos in the tube 2 at room temperature the ratio ortho-hydrogen to para-hydrogen is changed to 75:25. The hydrogen then flows through the comparison chamber 3 of the thermal conductivity apparatus. In the HD-hydrogen mixture with an unknown ortho-hydrogen:para-hydrogen ratio, to be examined for its HD content, which is also neon- and helium-free, and since it originates from a rectifying column also nitrogen-free, the ratio ortho-hydrogen to para-hydrogen is likewise established at 75:25 by conducting it over palladium-asbestos in the tube 4 at room temperature. The gas then flows through the measuring chamber 5 of the thermal conductivity apparatus. The indicator 6 shows a difference of the HD content of the two gas currents of 400 p.p.m. The hydrogen taken from the rectifying column thus contains 600 p.p.m. HD. The zero point of the apparatus is set as usual by conducting the same gas through both chambers 3 and 5, by way of line 7 and the cock 8.

*Example II (See Schematic Representation in FIGURE II)*

Helium- and neon-free electrolytic hydrogen with 200 p.p.m. HD is freed, by passage over deeply cooled silica gel (—183° C.) in the tube 10, of its content of nitrogen, etc. When passing through a tube 11 filled with palladium-asbestos at room temperature the ratio ortho-hydrogen:para-hydrogen is established at 75:25. The hydrogen then flows through the comparison chamber 12 of the thermal conductivity apparatus. A partial current of the hydrogen purified in 10 is conducted—by way of the tube 13 and the cock 14—through a low-temperature (—183° C.) gas-chromatic separating column 15 which is filled with a synthetic zeolite commercially available under the name of "Linde-molecular sieves." By passage through the tube 16 filled with palladium-asbestos at room temperature, the ratio ortho-hydrogen to para-hydrogen is established at 75:25. The gas then flows through the measuring chamber 17 of the thermal conductivity apparatus. The indicator 18 indicates the zero point.

Subsequently, a helium-neon-HD-hydrogen mixture, originating from a hydrogen-HD-rectifying column, to be tested for its HD content, is conducted through the low-temperature, gas-chromatic separating column 15, instead of the partial current of reference gas originating from 13. By passage through the tube 16 filled with palladium-asbestos the ratio ortho-hydrogen to para-hydrogen is established at room temperature at 75:25, and the gas mixture is conducted through the measuring chamber 17 of the thermal conductivity apparatus. The reference gas adsorbed in the separating column 15 is slowly replaced by the gas mixture to be tested, with the gases which are more difficult to absorb, particularly, helium and neon, leading. In the manner of frontal gas chromatography the measuring instrument indicates by stepwise varying deflections the content of helium, neon and the difference in the HD content compared to the reference gas; for example: 20 p.p.m. helium, 10 p.p.m. neon and 100 p.p.m. HD more than in the reference gas, that is 300 p.p.m. HD (see representation of the chromatogram in FIG. IIa).

A section of the recording tape of the measuring instrument is represented in FIG. IIa. The abscissa is the time, the ordinate the voltage difference at the ends of the measuring bridge. As can be seen from the diagram, the apparatus records from time 40 to time 41 the zero point, then up to time 42 in the first stage the content of 20 p.p.m. helium, in the second stage between the times 42 and 43 the content of 10 p.p.m. neon, and in the third stage, at 43, the deflection for 100 p.p.m. HD has to be added to the sum of the deflections of helium and neon.

*Example III (See Schematic Representation in FIGURE III)*

Hydrogen arriving from a low-temperature zone—for example, a rectifying column for hydrogen-HD—is conducted in two partial currents through the two chambers 23 and 24 of a thermal conductivity apparatus, one of the two partial currents remaining, until it enters the chamber 24, the same as it is when it arrives from the rectifying column, for example, ortho-hydrogen:para-hydrogen=30:70. The deflection of the indicator 25 is directly proportional to the deviation of the content of para-hydrogen in hydrogen of the high temperature equilibrium. The zero point of the apparatus is determined by conducting hydrogen with a ratio of ortho-hydrogen:para-hydrogen=75:25 through both chambers of the thermal conductivity apparatus, from branch 21 through the line 26 and cock 22.

*Example IV (See Schematic Representation in FIGURE IV)*

Helium- and neon-free electrolytic hydrogen is freed, by passage over low temperature (—183° C.) silica gel 30, from its content of nitrogen, etc. and is conducted at room temperature through a tube 31 filled with palladium-asbestos, a ratio ortho-hydrogen to para-hydrogen of 75:25 thereby being established. The hydrogen then flows through the comparison chamber 32 of the thermal conductivity apparatus.

A tube 33 filled with reduced cobalt on silica gel as a base material, and an adjoining gas-chromatic separating column 34, which is filled with a synthetic zeolite, for example, an aluminum silicate commerically available under the name "Linde-molecular sieves," are evacuated by way of the cock 36 and, after cooling to —195° C., are slowly filled with nitrogen-free hydrogen from the branch 35.

In the tube 33 para-hydrogen is enriched up to a ratio ortho-hydrogen:para-hydrogen of 50:50. At the outlet of the separating column 34 there accumulates a sufficient amount of pure, HD-free para-hydrogen, which is conducted, after opening the cock 37, at room temperature through the tube 38 filled with palladium-asbestos, to obtain a ratio ortho-hydrogen:para-hydrogen of 75:25. The HD-free hydrogen then flows through the measuring chamber 39 of the thermal conductivity apparatus. The deflection of the instrument 40 indicates that the HD-content of the electrolytic hydrogen is greater by 190 p.p.m. than in the HD-free hydrogen, so that the HD content of the electrolytic hydrogen has been determined in absolute values.

We claim:

1. Method of determining the content of HD, in addition to para-hydrogen, in a hydrogen sample by measuring thermal conductivity, which comprises adapting the concentration ratio of ortho- to para-hydrogen in said sample to equilibrium at the temperature of the thermal conductivity measuring means by passing the hydrogen sample over an ortho-para equilibrium-establishing catalyst substance at substantially room temperature, and then comparing the thermal conductivity of said hydrogen sample with the thermal conductivity of a reference stream of pure hydrogen having an exactly defined HD concentration, said concentration including the value zero, the concentration ratio of ortho- to para-hydrogen of which reference stream of pure hydrogen has also been adapted to equilibrium at the temperature of the thermal conductivity measuring means in the manner described above.

2. Method as claimed in claim 1, in which the reference stream of pure hydrogen is produced from technical hydrogen, containing impurities including $N_2$, by freeing said technical hydrogen from its impurities by freezing them out and adsorbing them at low temperature.

3. Method of determining the content of HD, in addition to para-hydrogen, in a technical hydrogen sample contaminated with impurities including $N_2$, $O_2$, CO and Ar by measuring thermal conductivity which comprises freezing out and adsorbing the impurities at low temperature, adapting the concentration ratio of ortho- to para-hydrogen in said sample to equilibrium at the temperature of the thermal conductivity measuring means by passing the hydrogen sample over an ortho-para equilibrium-establishing catalyst substance at substantially room temperature, and then comparing the thermal conductivity of said hydrogen sample with the thermal conductivity of a reference stream of pure hydrogen having an exactly defined HD concentration, said concentration including the value zero, the concentration ratio of ortho- to para-hydrogen of which reference stream of pure hydrogen has also been adapted to equilibrium at the temperature of the thermal conductivity measuring means in the manner described above.

4. Method as defined in claim 3 in which the reference stream of pure hydrogen is produced from technical hydrogen containing impurities including $N_2$, by freeing said technical hydrogen from its impurities by freezing them out and adsorbing them at low temperature.

5. Method of determining the content of HD, in addition to para-hydrogen, in technical hydrogen contaminated with impurities including neon and helium by measuring the thermal conductivity as defined in claim 1, which comprises freezing out and adsorbing part of the impurities at low temperature, separating the components of the remaining gas by passing them through a gas-chromatographic column, and adapting the concentration ratio of ortho- to para-hydrogen in said remaining gas components to equilibrium at the temperature of the thermal conductivity measuring means by passing the remaining gas components over an ortho-para equilibrium-establishing catalyst substance at substantially room temperature and comparing the thermal conductivity of said remaining gas components with the thermal conductivity of a reference stream of pure hydrogen having an exactly defined HD concentration, the concentration ratio of ortho- to para-hydrogen of which reference stream of pure hydrogen previously has also been adapted to equilibrium at the temperature of the thermal conductivity measuring means in the manner described above.

6. Method defined in claim 5, in which before the adjustment of the ortho-para ratio to the temperature of the measuring means, the helium- and neon-containing hydrogen-HD mixture is conducted through a gas-chromatic separating column of such dimensions that the constituents helium, neon and HD are indicated in the thermal conductivity apparatus successively in steps corresponding to their different travel velocities.

7. Method defined in claim 6, in which a synthetic sodium-aluminum silicate zeolite is used as a filling for the gas-chromatic column.

8. Method defined in claim 1, in which the reference stream of pure hydrogen with an HD concentration of the value zero is produced by gas-chromatography from HD-containing hydrogen.

9. Method according to claim 8, in which pure hydrogen is introduced into a low-temperature gas-chromatic separating column at such a velocity that HD-free para-hydrogen accumulates at the outlet of the column as the fraction with the maximum travel velocity, and that the same is introduced as reference gas stream into the thermal conductivity apparatus through a tube filled with palladium-asbestos at room temperature.

10. Method according to claim 9, in which the pure hydrogen, before entering the separating column, is conducted at the boiling temperature of nitrogen over silica gel impregnated with a reduced cobalt salt which adjusts the ratio of ortho- to para-hydrogen to equilibrium at low temperature.

11. Method for measuring the content of para- and ortho-hydrogen, in addition to HD, in hydrogen by measuring thermal conductivity, which comprises measuring the thermal conductivity of the hydrogen of unknown ortho- and para-hydrogen content and comparing said thermal conductivity with the thermal conductivity of the hydrogen of unknown ortho- and para-hydrogen content after having adapted its concentration ratio of ortho- to para-hydrogen to equilibrium at the temperature of the thermal conductivity measuring means by passing the hydrogen over an ortho-para equilibrium-establishing catalyst substance at substantially room temperature.

12. Method as claimed in claim 1 in which the catalyst substance is palladium.

13. Method according to claim 1 in which the catalyst medium is titanium.

14. Method as claimed in claim 1 in which the catalyst substance is a paramagnetic substance.

15. Method as claimed in claim 14, in which said paramagnetic substance is metallic cobalt.

16. Method as claimed in claim 1 in which the catalyst substance is finely divided and is supported on silica gel.

References Cited in the file of this patent

Silvestri et al.: "Review of Sci. Instruments" 27, 388–391 (1956).

Weitzel: "J. Res. of N.B.S.," Research Paper 2840, 60, 221–227 (1958).

Stewart et al.: "J. Sci. Instruments" 32, 26–29 (1955).

"Nuclear Science Abstracts" 13: 12, 455, July 31, 1959; 13: 3623, March 31, 1959.